April 29, 1930.    W. M. JOHNSON    1,756,690
COMBINED COOKING AND HEATING APPARATUS
Filed July 12, 1928    2 Sheets-Sheet 1
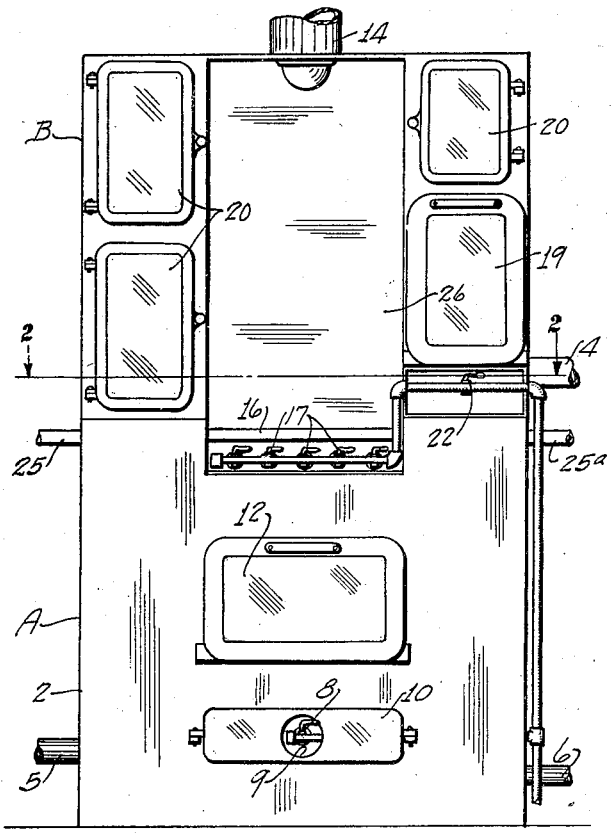
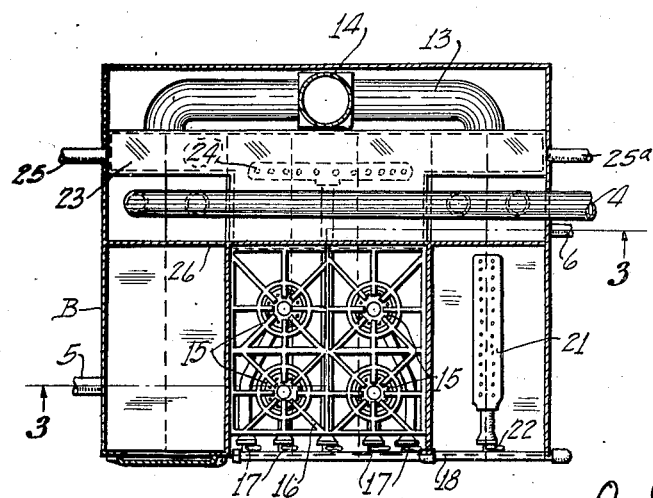
INVENTOR
Willard M. Johnson.
By Bakewell & Church
ATTORNEYS April 29, 1930.  W. M. JOHNSON  1,756,690
COMBINED COOKING AND HEATING APPARATUS
Filed July 12, 1928  2 Sheets-Sheet 2

INVENTOR
Willard M. Johnson.
By Bakewell Church
ATTORNEYS

Patented Apr. 29, 1930

1,756,690

UNITED STATES PATENT OFFICE

WILLARD M. JOHNSON, OF KANSAS CITY, MISSOURI, ASSIGNOR OF TWELVE AND ONE-FOURTH PER CENT TO WILLIAM A. OBERKROM, TWELVE AND ONE-FOURTH PER CENT TO PETER S. JAMERSON, TWELVE AND ONE-FOURTH PER CENT TO PAUL C. JAMERSON, AND TWELVE AND ONE-FOURTH PER CENT TO JEWELL H. HALL, ALL OF KANSAS CITY, MISSOURI

COMBINED COOKING AND HEATING APPARATUS

Application filed July 12, 1928. Serial No. 292,185.

This invention relates to cooking stoves and also to boilers for hot water and steam heating systems.

The main object of the invention is to provide an apparatus that is adapted to be used in homes and dwellings for cooking food and for heating water and producing steam that is supplied to the radiating devices of a heating system.

Another object is to provide a combined cooking and heating apparatus that is compact, of attractive appearance and inexpensive to construct.

Another object is to provide a combined cook stove and boiler for heating systems, in which the same source of heat is used to operate the boiler and to heat a baking oven, thereby producing a heating apparatus that comprises a baking oven which is normally in an operative condition to bake food when the apparatus is in use.

And still another object of the invention is to provide a combined cook stove and boiler for heating systems that is equipped with the essential elements of a conventional gas stove, which elements are so constructed and arranged that the owner of the apparatus has a complete gas stove that can be used in the summer months when the boiler of the heating system is not in use.

Figure 1 of the drawings is a front elevational view of an apparatus embodying my invention.

Figure 2 is a horizontal sectional view, taken on the line 2—2 of Figure 1, looking in the direction indicated by the arrows.

Figure 3:
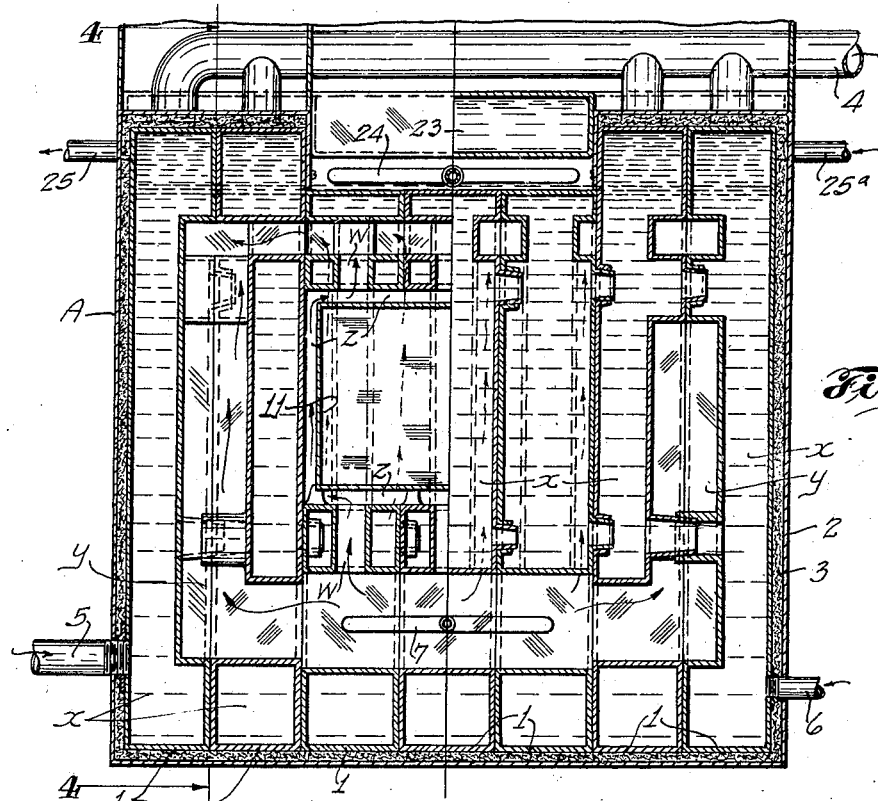
Figure 3 is a vertical transverse sectional view of the boiler, taken on approximately the line 3—3 of Figure 2, looking in the direction indicated by the arrows.

Referring to the drawings which illustrate the preferred form of my invention, A designates as an entirety the lower portion of the apparatus which constitutes a boiler for heating water or for producing steam that is supplied to the radiating devices of a heating system, and B designates as an entirety the upper portion of the apparatus which constitutes a cooking stove. The boiler A is preferably composed of a plurality of vertically-disposed sections 1 that are equipped with water spaces $x$ and gas spaces $y$, the said sections 1 being combined in such a way that the water spaces of the various sections communicate with each other, thereby permitting the water to circulate through the boiler, and the gas spaces of the various sections co-operate with each other to form gas flues or circulating passageways for the medium that is used to heat the boiler. The sections 1 are preferably encased in a shell 2 that is provided with an inner lining 3 of heat insulating material, so as to impart an attractive appearance to the apparatus and retard the escape of heat from the boiler.

Figure 4:
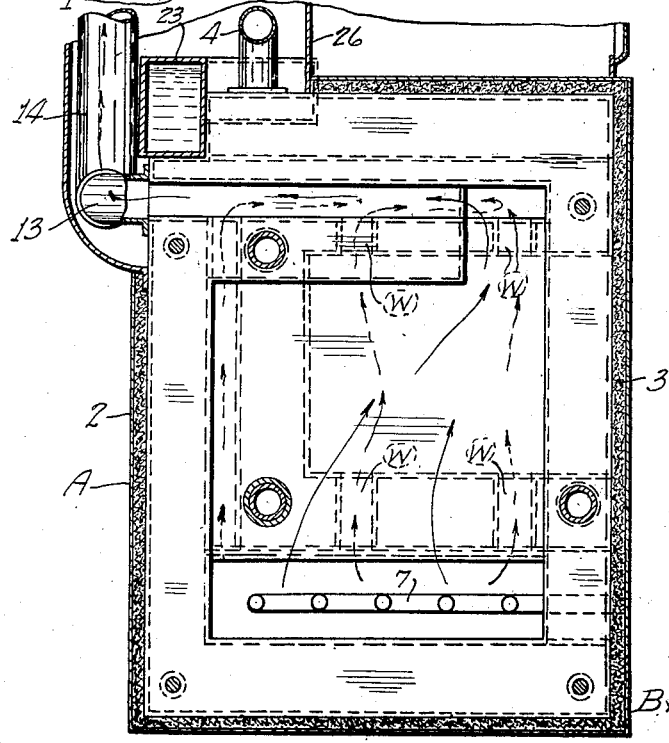
Figure 4 is a vertical sectional view, taken on the line 4—4 of Figure 3, looking in the direction indicated by the arrows.

In the form of my invention herein illustrated the boiler A is intended to be used in connection with a hot water heating system and is provided with a water supply pipe 4 constructed in the form of a manifold that is attached to the upper ends of some of the sections 1 of the boiler, as shown clearly in Figures 2, 3 and 4. Said supply pipe leads to the radiators (not shown) of the heating systems, and a return pipe 5 leads from said radiators back to the boiler, as shown in Figure 3. Water is admitted to the boiler by an inlet pipe 6. Any suitable source of heat may be used to operate the boiler, but I prefer to equip the boiler with a gas burner 7 whose controlling valve 8 is accessible through an opening 9 in the front wall of the boiler, formed preferably in a door 10 that can be opened or removed when inspection or repair of said burner is necessary.

A baking oven 11 is built into the boiler in such a manner that some of the products of combustion which escape from the burner 7 will circulate over the walls of said oven and maintain it in a heated condition when the boiler is in operation. As shown in Figure 1, the oven 11 is provided with a door 12 located in the front wall of the boiler, and said oven is so arranged that portions of the sections 1 of the boiler will be spaced away from the sides, top, bottom and rear wall of the oven sufficiently to form a gas flue $z$ through which products of combustion from the burner 7 can circulate, circulation between the gas flue $z$ and some of the gas flues $y$ being established by gas circulating passageways $w$ formed in the horizontally-disposed portions of the intermediate sections 1 of the boiler that extend over the top and bottom walls of the oven 11. When the boiler is in operation some of the gases from the burner 7 flow over the bottom, side and rear walls, and top wall of the oven 11, and then escape to the gas discharge manifold 13 that establishes communication between the main gas flues $y$ of the boiler and the gas off-take pipe 14, thereby causing the oven 11 to be maintained in a heated condition when the boiler is in operation.

The upper portion B of the apparatus that constitutes the cooking stove comprises a plurality of gas burners 15 of the kind that are used to form the top burners of a conventional gas stove, said burners 15 being arranged under a grating 16, as shown in Figure 2, and each of said burners being controlled by a separate valve 17 on a gas supply pipe 18. At opposite sides of the space in which the top burners 15 are arranged are a plurality of chambers, one of which constitutes a baking oven that is intended to be used in the summer time when the boiler is not in use, and the remaining chambers being used as warming closets for dishes or for foods which it is desired to keep in a partial heated condition. The said summer oven is provided with a door 19 and each of the warming closets is provided with a door 20, the summer oven being heated by a burner 21, shown in Figure 2, that is governed by a controlling valve 22 on the gas supply pipe 18. In order that the owner of the apparatus will have an ample supply of hot water at all times, a hot water reservoir 23 is arranged transversely of the apparatus in contact with portions of one or more sections 1 of the boiler, as shown more clearly in Figures 2 and 4. During the winter months, when the boiler is in use, the heat from the sections 1 of the boiler will maintain the water in the reservoir 23 in a highly heated condition, and during the summer months, when the boiler is not in use, the reservoir 23 is heated by a gas burner 24 that is arranged under the central portion of the same, as shown in Figure 2. The reservoir 23 is provided with an inlet pipe 25 and a discharge pipe $25^a$, as shown in Figure 2. The casing or shell 2 of the boiler is preferably extended upwardly, so as to serve as side walls for the stove portion B of the apparatus, and a vertically-disposed partition plate 26 is arranged at the rear end of the space in which the top burners 15 are located so as to hide from view the hot water reservoir 23, the water discharge manifold 4 of the boiler and the gas discharge manifold 13.

An apparatus of the construction above described performs the dual function of a gas cook stove and a boiler for a heating system, thereby effecting a considerable saving in the expense of equipping a dwelling with a suitable means for heating the dwelling and cooking the food of the occupants, and it consumes considerably less space than the two separate units now generally used for heating and cooking purposes. It is more attractive in appearance than the conventional hot water boilers for heating systems, and it can be operated at a lower cost than two separate units, due to the fact that some of the products of combustion from the means that is used to operate the boiler are used to heat the baking oven 11, and some of the heat which radiates from the sections of the boiler is used to heat the water in the reservoir 23. During the summer months or at such times when the boiler A is not in use, the oven that is heated by the burner 21 is used for baking food and the water in the reservoir 23 is heated by the burner 24.

Having thus described my invention, what I claim as new and desire to secure by Letters Patent is:

1. A combined cooking stove and heating apparatus, comprising a boiler composed of a number of vertically-disposed sections that are provided with water circulating passageways and gas circulating passageways, a baking oven imbedded in said boiler and having some of its walls spaced away from the sections of the boiler so as to form a gas circulating flue, a gas burner under said oven that supplies heat to the oven and also to the sections of the boiler, a water supply manifold connected to the upper ends of the sections of the boiler, a water return pipe leading to the lower portion of the boiler, gas burners arranged in a space in the upper portion of the boiler so as to form the top burners of a gas cooking stove, a summer baking oven arranged over the boiler, and a separate gas burner for heating said summer oven.

2. A combined cooking stove and heating apparatus, comprising a boiler composed of a number of vertically-disposed sections that are provided with water circulating passageways and gas circulating passageways, a baking oven imbedded in said boiler and having some of its walls spaced away from the sections of the boiler so as to form a gas circulating flue, a gas burner under said oven that supplies heat to the oven and also to the sections of the boiler, a water supply manifold connected to the upper ends of the sections of the boiler, a water return pipe leading to the lower portion of the boiler, gas burners arranged in a space in the upper portion of the boiler so as to form the top burners of a gas cooking stove, a summer baking oven arranged above the boiler, a separate gas burner for heating said summer oven, a water reservoir arranged in dierct contact with some of the sections of the boiler and adapted to be heated by the same when the boiler is in use, and a separate gas burner for heating said water reservoir.

3. A combined cooking and heating apparatus, comprising a boiler composed of a plurality of vertically-disposed sections provided with water circulating passageways and gas circulating passageways, a gas burner for heating said boiler, a baking oven disposed so that when the boiler is in use the products of combustion from said gas burner will circulate around said oven, an insulated casing for said boiler, a burner space in the upper portion of the boiler provided with a grating on which cooking utensils are adapted to be placed, gas burners arranged underneath said grating, compartments above the boiler at opposite sides of said burner space, a gas burner for supplying heat to one of said compartments so that it will serve as a summer oven when the boiler is not in use, a water reservoir arranged transversely of the boiler at the rear end of same, and positioned in direct contact with some of the sections of the boiler so as to be heated directly by the boiler when the boiler is in use, and a separate means for heating said water reservoir.

WILLARD M. JOHNSON.